United States Patent [19]

Wyrill, III

[11] Patent Number: 4,608,933
[45] Date of Patent: Sep. 2, 1986

[54] APPARATUS FOR CONVERTING A CHISEL PLOW TO A PLANTER

[75] Inventor: John B. Wyrill, III, Kirwin, Kans.

[73] Assignee: Wyrill Leasing, Inc., Kirwin, Kans.

[21] Appl. No.: 664,146

[22] Filed: Oct. 24, 1984

[51] Int. Cl.$^4$ .......................... A01C 5/06; A01B 49/06
[52] U.S. Cl. ........................................ 111/85; 111/66; 172/247; 172/176; 172/672
[58] Field of Search ............... 172/672, 398, 484, 247, 172/176, 397, 705, 706, 483, 417, 497, 500, 551, 624, 307; 111/6, 7, 85, 59, 60, 68, 86, 66, 62, 61, 81, 83, 52

[56] References Cited

U.S. PATENT DOCUMENTS

| | | | |
|---|---|---|---|
| 404,108 | 5/1889 | Patric | 111/66 |
| 1,111,175 | 9/1914 | Packham | 111/66 |
| 1,854,811 | 4/1932 | Sonander | 111/84 |
| 2,768,591 | 10/1956 | James | 111/7 |
| 3,854,429 | 12/1974 | Blair | 111/7 |
| 4,208,974 | 6/1980 | Dreyer | 172/705 |
| 4,311,104 | 1/1982 | Steilen | 111/68 |
| 4,519,325 | 5/1985 | Miller | 111/85 |
| 4,520,878 | 6/1985 | Smith | 172/705 |

FOREIGN PATENT DOCUMENTS 1112110 11/1981 Canada ................................. 172/705
934953 6/1982 U.S.S.R. ............................. 172/705

Primary Examiner—Richard J. Johnson
Attorney, Agent, or Firm—Schmidt, Johnson, Hovey & Williams

[57] ABSTRACT

Apparatus is provided for readily converting a conventional pull-type implement such as a chisel plow into an effective planter. The conversion assembly includes a furrow opener such as a narrow shoe located adjacent the lower end of the chisel shank, along with a trailing seed delivery tube and a pivotal furrow-closing press wheel or the like. A four-bar adjustable linkage assembly serves to operably couple the shank and press wheel so that the wheel is shifted downwardly in response to limited upward shifting of the shank, whereby the wheel is maintained in operative contact with the earth during use. The wheel also serves as a gauge stop for maintaining proper furrow depth, and the linkage adjustment permits selective setting of the wheel for different furrow depths. The conventional curvilinear chisel shank acts as one of the arms of the linkage assembly, together with the shank assembly bracket and a pair of links provided as a part of the conversion apparatus.

17 Claims, 6 Drawing Figures

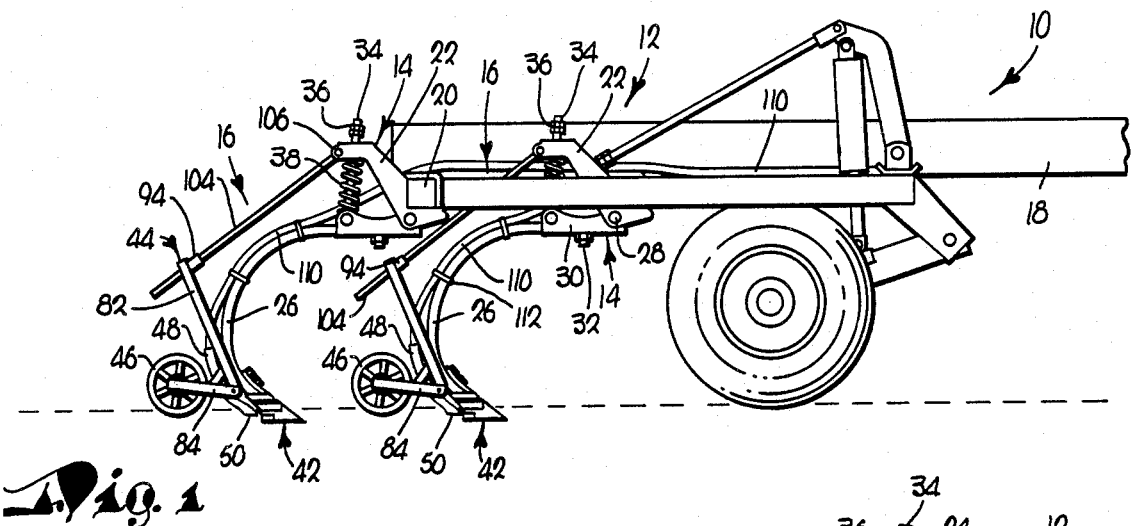
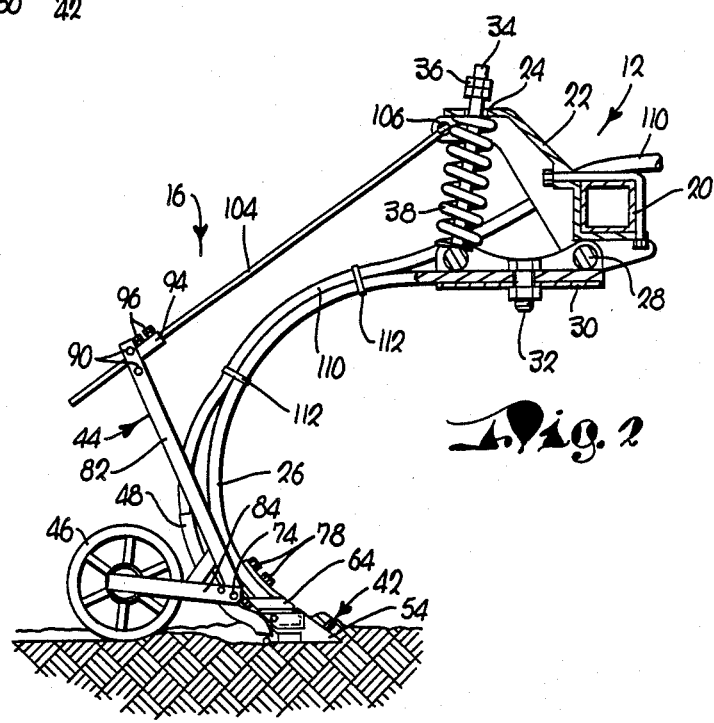
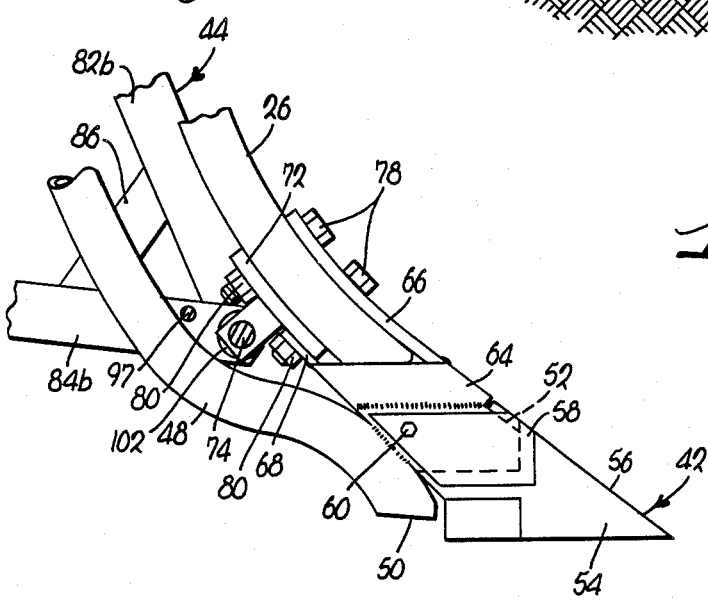
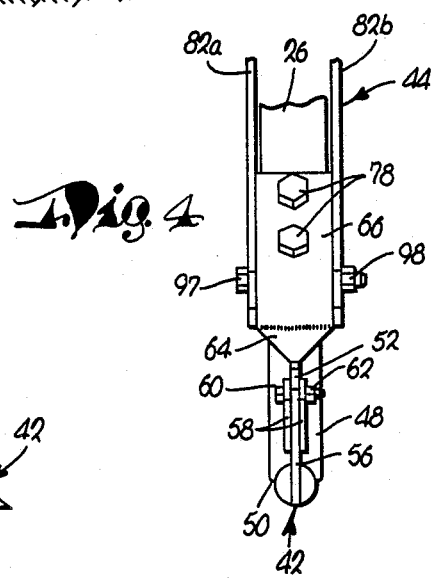

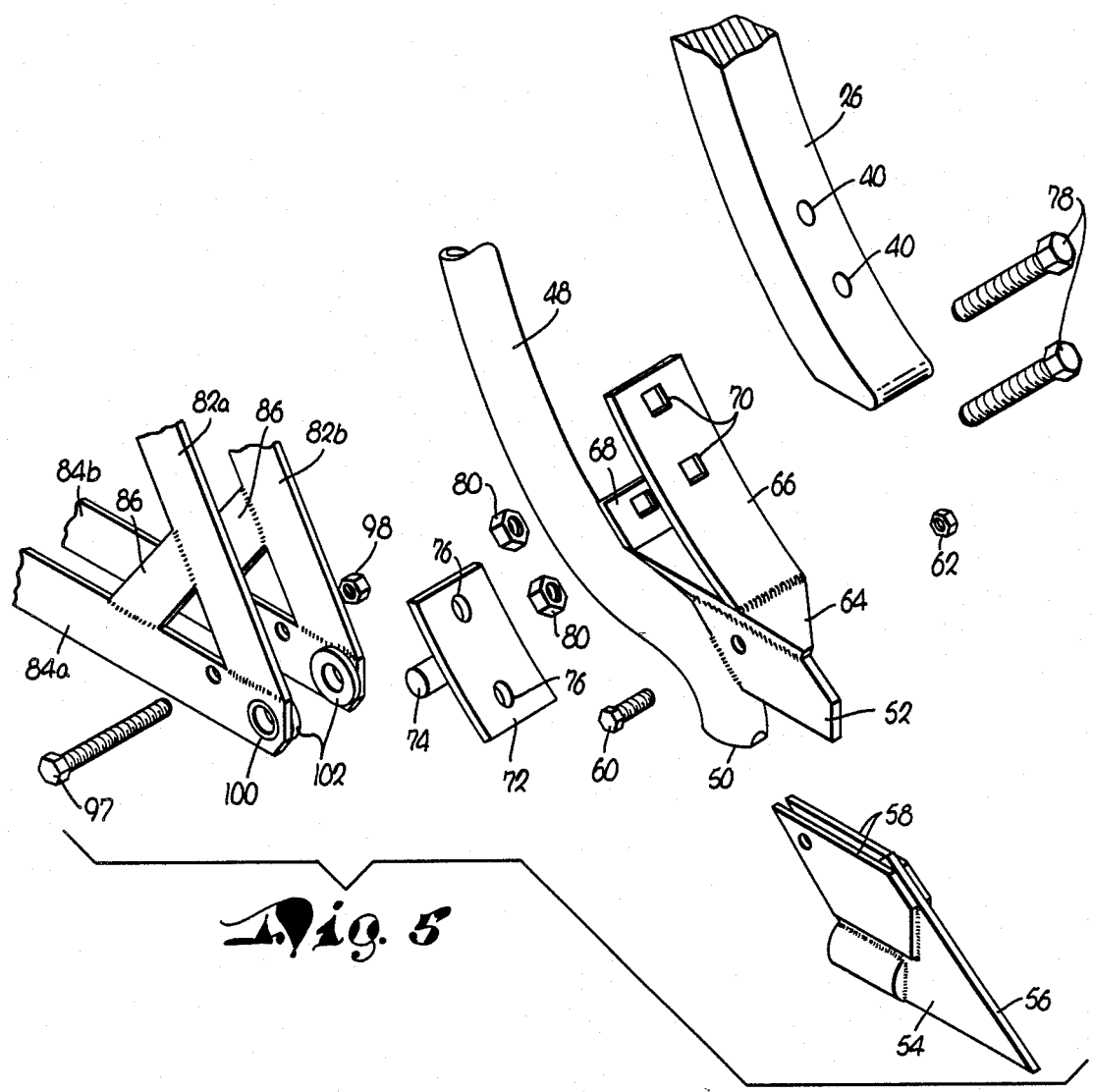
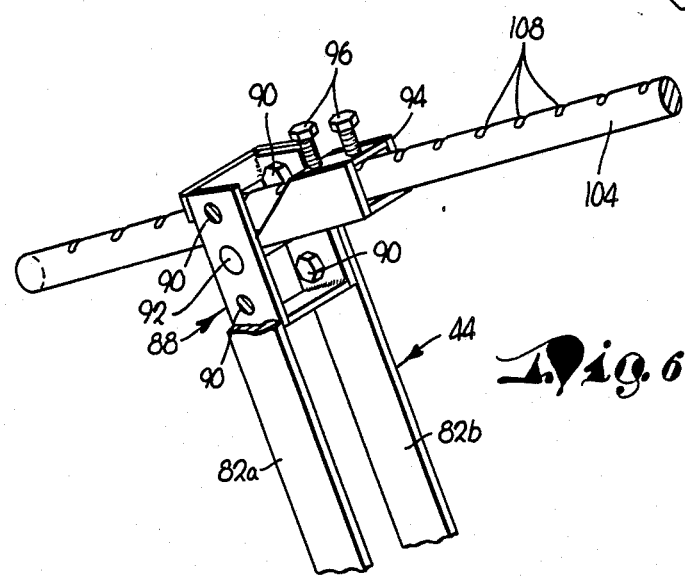

APPARATUS FOR CONVERTING A CHISEL PLOW TO A PLANTER

BACKGROUND OF THE INVENTION

1. Field of the Invention

The present invention is broadly concerned with an improved pull-behind planter implement which is advantageously constructed by conversion of a conventional pull-type earth-working implement such as a chisel plow. More particularly, it is concerned with such a planter, as well as the conversion apparatus, which makes use of a specialized linkage assembly operably coupled with a trailing, earth-engaging press wheel or the like which is designed for causing downward pivotal movement of the wheel in response to limited upward pivotal movement of the chisel shank; in this fashion, continuing contact between the wheel and the earth is assured during normal operation.

2. Description of the Prior Art

Mechanized planter implements have long been available to the farmer for efficient planting of seed crops such as corn. Without known exception, however, such planters have been specialized implements usable only for a single purpose, i.e., seed planting. Inasmuch as planting operations occur on a relatively infrequent basis, it will be appreciated that a planter represents a relatively costly investment for the farmer. On the other hand, most if not all commercial farming operations make use of pull-behind earth working implements of the tillage variety. For example, so-called chisel plows are very commonly employed in certain farming regions. Such chisel plows include a mobile frame carrying a plurality of laterally spaced spring trip shank assemblies. Typically, each of these shank assemblies is mounted on a drawbar and includes a downwardly and rearwardly extending curvilinear shank having a tillage device secured to the lowermost end thereof. In addition, such shank assemblies include spring structure serving to bias the shank and earth working tool downwardly, while permitting upward pivotal movement of the shank against the bias of the spring structure so as to accommodate uneven terrain and rocky soils.

Inasmuch as conventional chisel plows or other similar implements are almost universally available, it would be a decided advantage for the farmer to be able to make use of the same as a planter. However, there has heretofore been no way to efficiently convert a chisel plow or the like for use as a planter, and as a consequence farmers have been forced to purchase and maintain separate specialized implements for tillage and planting purposes.

SUMMARY OF THE INVENTION

The present invention overcomes the problems noted above, and provides an apparatus for readily converting a conventional pull-type earth-working implement such as a chisel plow into a planter. Advantageously, the conventional implement includes an elongated, rearwardly and downwardly extending shank adapted to receive a lowermost earth-engaging tool, with means supporting the upper end of the shank for pivoting movement thereof about a generally horizontal shank pivot axis. Spring structure is operably coupled with the shank for biasing the shank downwardly and for permitting upward pivoting movement thereof against the bias of the spring structure. In particularly preferred forms, the spring structure includes an upwardly and rearwardly extending, apertured bracket fixed to the implement toolbar, along with an elongated, downwardly extending link passing through the upper end of the bracket and secured to the shank. A coiled spring is disposed about the link and is captively retained between the shank and underside of the bracket structure.

The conversion apparatus includes means such as an elongated, relatively narrow, furrow-opening shoe for creating a planting furrow in the earth as the implement is advanced across the field, along with means mounting the shoe or the like adjacent the lower end of the implement shank. Means preferably in the form of an elongated delivery tube is provided for delivery of seed to the planting furrow. Finally, the apparatus includes a furrow closing assembly having an earth-engaging element for closing the seed planting furrow, most preferably in the form of a rotatable press wheel. Linkage means is provided for pivotally supporting the press wheel in an up-and-down pivotal, earth-engaging, trailing relationship to the furrow-opening shoe and seed delivery tube, and for causing downward pivotal movement of the wheel in response to limited upward pivotal movement of the shank about the shank pivot axis. In this fashion, continual contact between the press wheel and the earth is assured.

The linkage assembly preferably comprises a four-bar linkage, with the chisel plow shank being one of the bars of the assembly. Further, the linkage assembly includes an upwardly extending first linkage arm pivotally secured to the shank proximal to the lower end thereof, a second, forwardly extending linkage arm pivotally secured adjacent the upper end of the first linkage arm and supported for pivotal movement thereof adjacent its forward end remote from the first linkage arm and at a point above the shank pivot axis. A rearwardly extending mounting arm is secured to the lower end of the first linkage arm, and the earth-engaging press wheel or the like is secured adjacent the rearward end of the mounting arm.

In the preferred construction, the press wheel or similar element also serves as a depth stop for the furrow-opening means, with the linkage being adjustable for varying the vertical position of the wheel relative to that of the furrow-opening means. This adjustment structure most advantageously includes means for permitting pivotal coupling of the first linkage arm to the second linkage arm at any one of a number of spaced locations along the length of the latter, whereby the critical position of the pivotally mounted wheel or the like can be readily adjusted relative to the furrow-opening means.

BRIEF DESCRIPTION OF THE DRAWINGS

FIG. 1 is a fragmentary side view of a conventional chisel plow implement, with the conversion apparatus of the present invention affixed to the respective shank assemblies of the implement;

FIG. 2 is a somewhat enlarged view in partial section of one of the implement shank assemblies converted for use as a planter, during planting operations;

FIG. 3 is a fragmentary side view in partial vertical section illustrating the construction of the lowermost working end of the converted implement depicted in FIG. 2;

FIG. 4 is a front view of the working end assembly depicted in FIG. 3;

FIG. 5 is an exploded perspective view of the lower working end of a converted shank assembly in accordance with the invention; and FIG. 6 is a perspective view illustrating in detail the preferred adjustment structure between the first and second linkage arms of the conversion apparatus, which serves to permit up-and-down vertical adjustment of the press wheel.

DESCRIPTION OF THE PREFERRED EMBODIMENT

Turning now to the drawings, a planter implement 10 in accordance with the present invention preferably comprises a conventional earth working device such as a chisel plow 12. Each of the shank assemblies 14 of the plow 12 have been converted for use as respective planters, by means of conversion apparatus broadly referred to by the numeral 16.

The chisel plow 12 is of the usual variety and includes a mobile frame 18 including one or more laterally extending drawbars 20 (see FIG. 2). The respective shank assemblies 14 are located in laterally spaced and staggered relationship across the width of the frame 18, so as to provide desired row spacings between furrows. In this regard, each of the assemblies 14 includes an upwardly and rearwardly extending, channel-type bracket 22 which is affixed to a drawbar 20. The upper end of the bracket 22 is apertured as at 24, for purposes which will be made clear. An elongated, downwardly and rearwardly extending, curvilinear shank 26 also forms a part of each assembly 14, and is pivotally supported between the legs of the corresponding bracket 22 by means of pin 28 and lower, generally horizontally extending, secondary bracket 30. As illustrated, the shank 26 is secured to secondary bracket 30 by means of bolt 32, so that the upper end of the shank 26 is supported for up-and-down pivotal movement about a generally horizontal shank pivot axis coincident with pin 28.

An elongated link 34 having an enlarged head 36 extends downwardly through aperture 24 of each bracket 22, and is pivotally coupled to secondary bracket 30 as illustrated. A coil spring 38 is disposed about link 34 and is captively retained between secondary bracket 30 and the underside of the upper end of bracket 22, as best seen in FIG. 2. The lowermost end of shank 26 (see FIG. 5) is provided with a pair of mounting apertures 40 which facilitate attachment of any one of a number of desired earth working tools to the shank.

The conversion apparatus broadly referred to be the numeral 16 includes a lower, shank-mounted working assembly 42, and a furrow-closing assembly 44 having in preferred forms a press and gauge wheel 46 and a linkage assembly serving to pivotally support the wheel 46 and to move the latter downwardly in response to limited upward pivotal movement of the shank 26.

In more detail, and referring particularly to FIG. 5, it will be seen that the lower working assembly 42 includes an elongated, curvilinear metallic seed delivery tube 48 having a lowermost seed outlet opening 50, and a forwardly projecting, apertured mounting tongue 52. A furrow-opening shoe 54 presenting a leading edge 56 and a pair of laterally spaced apart apertured mounting webs 58 is also provided, with the shoe 56 being removably attached to tongue 52 by reception of the latter between the webs 58; a bolt 60 and nut 62 are then employed to removably affix the shoe 54 to the tongue 52.

A tapered, somewhat prism-shaped block 64 is affixed to tongue 52 and supports a pair of upwardly projecting, apertured, fore-and-aft plates 66, 68. As best seen from a consideration of FIGS. 3 and 5, the plates 66, 68 are spaced a sufficient distance apart to allow for reception of the lower end of shank 26. Moreover, the apertures 70 provided in forward plate 68 are designed to align with the apertures 40 of shank 26, whereas the single aperture in shorter aft plate 68 is designed to mate with the lower apertures 40, 70 provided in the shank 26 and forward plate 66, respectively.

A rearward pivot mounting plate 72 also forms a part of the working assembly 42, and includes rearward, laterally extending cylindrical shank 74, along with mounting apertures 76. As best seen in FIG. 3, the plate 70 is situated in abutting contact with the rear surface of shank 26, and with aft mounting plate 68 disposed in facial contact with the rearmost face of the plate 72. A pair of mounting bolts 78 and nuts 80 are then employed to secure the complete assembly. That is to say, the bolts 78 extend through the apertures 70 of plate 66, the apertures 40 of shank 26, the apertures 76 of plate 72, and with the lowermost bolt 78 passing through the single aperture of plate 68.

The furrow-closing assembly 44 includes a bifurcated first linkage arm 82 which includes a pair of laterally spaced apart, upwardly and rearwardly extending plates 82a and 82b. A pair of generally horizontal, rearwardly extending, apertured mounting legs 84a, 84b are respectively secured to the lowermost ends of the corresponding plates 82a and 82b, and oblique reinforcing struts 86 are provided for rigidifying the entire assembly. The press wheel 46 is mounted for rotation between the mounting legs 84a, 84b, as will be readily apparent from a consideration of FIG. 2.

The upper end of the first linkage arm 82 is interconnected by means of a U-shaped pivot bracket 88 which is dimensioned to fit between the respective plates. Appropriate nut and bolt assemblies 90 extending through the sidewalls of the bracket 88, as well as through the plates 82a, 82b, serve to rigidify and interconnect the upper end of the first linkage arm. In addition, a rotatable pivot pin 92 is carried by the bracket 88, and carries a forwardly extending, tubular adjustment bracket 94. The latter includes a pair of set screws 96, the purpose of which will be made clear hereinafter.

The lower end of the first linkage arm 82 is interconnected by means of a bolt 96 and nut 98 passing through the legs 84a, 84b as best seen in FIG. 5. Further, it will be observed that the forwardmost ends of the legs 84a, 84b are apertured as at 100 and provided with internal bushings 102. The outermost ends of the shank 74 are received within corresponding bushings 102 and apertures 100 of the respective mounting legs 84a, 84b, in order to thereby pivotally couple the first linkage arm 82, as well as press wheel 46, to the shank 26.

The linkage assembly forming a part of the present invention also includes a second, forwardly and upwardly extending cylindrical linkage arm 104. The arm 104 is received within bracket 94 as best illustrated in FIG. 6, so that the arms 82, 104 are pivotally interconnected adjacent the upper end of the first arm 82. The forward end of second linkage arm 104 is pivotally supported by means of a conventional clevis assembly 106 to the uppermost and rearmost end of brackets 22. As a consequence, the forwardmost end of the link 104 is pivotal about a generally horizontal axis which is above and somewhat rearward of the shank pivot axis.

The lower and rearward end of the link 104 is provided with a series of axially spaced apart notches 108. The notches cooperate with the set screws 96, in order to securely and pivotally couple the linkage arms 82, 104. Further, it will be readily appreciated that the point of attachment between the linkage arms can be easily altered simply by loosening the set screws 96, and shifting the arm 82 axially along the length of the link 104, whereupon the set screws 96 can be retightened. This adjustment in turn causes up-and-down adjustment of the underlying press wheel 46. As those skilled in the art will readily appreciate, adjustment as described serves to vary the furrow depth for the overall implement, inasmuch as the press wheel 46 also serves as a gauge stop for furrow depth.

In order to deliver seed to the respective tubes 48, corresponding flexible seed lines 110 are provided which extend from a source of seed (not shown) to the upper ends of respective tubes 48. The flexible lines 110 are conventionally secured to each shank assembly by means of bands 112.

In the use of the present invention, a conventional chisel plow or other pull-behind implement is modified as follows. First, and considering the shank assemblies 14 depicted in the present drawings, the normal springs supplied with these units are removed, and lesser strength coil springs 38 are substituted therefor. This is done in order to facilitate planting operations, which do not require the heavy trip springs of chisel plow shanks. Use of the lighter springs 38 permits adequate up-and-down flexure for planting in conventional or no-till conditions.

Following spring replacement, the lowermost working assemblies 42 are affixed to the working ends of the respective shanks 26, as described above. At this point, the first and second linkage arms 82, 104 are attached as explained. Finally, the seed lines 110 are secured to the shank assemblies in the manner indicated.

During use of the converter planter implement, furrow depth is set by appropriate adjustments of the first linkage arms 82 relative to the second linkage arms 104, and for this purpose use is made of the bracket 94 and set screws 96. During planting operations, the leading shoe 54 of each of the converted shank assemblies serves to open a narrow planting furrow. Seed is thereupon delivered through the tubes 110 and tubes 48 for deposit in the opened furrows (see FIG. 2). Thereupon the trailing press wheel 46 serves to close the furrow and complete the planting operation. The preferred shoe design is very narrow, thus preventing throwover of soil to companion openers. In addition, the narrow furrows created by the shoes 54 in some instances renders the press wheel unnecessary for a closing function. The narrow press wheels 46, which are set behind corresponding shanks 26, do not interfere with trash flow and do not accumulate excess soil during wet conditions. Location of the press wheel between the mounting legs 84a, 84b also facilitates setting of the linkage for deeper planting depths.

Finally, it will be seen that the overall construction of the converted implement of the invention presents in effect a four-bar or four-point linkage. That is to say, the first and second arms 82, 104, together with the shank 26 and upwardly and rearwardly extending bracket 22 define the desirable linkage which approximates a parallelogram linkage (although the invention is not so limited). As a consequence however, when the shanks 26 pivot upwardly to a limited extent during advancement of the implement across a field, the described linkage assembly serves to correspondingly shift the press wheels 46 downwardly. Thus, continual working contact between the press wheel 46 and the earth is assured, even during slight up-and-down movements of the shanks 26. Of course, in the event that the shank assembly encounters a rock or other large obstruction it will swing upwardly completely out of the ground, as is the usual case. However, upon reentering the earth, the desired planting function will be immediately resumed.

I claim:

1. Apparatus for use in converting a conventional pull-type earth-working implement into a planter, said conventional implement including a stationary bracket having an upper end and a lower end, an elongated, rearwardly and downwardly extending shank adapted to receive a lowermost earth-engaging tool, fixed pivot means pivotally attaching the upper end of said shank to the lower end of said bracket for upward and rearward swinging of the shank about said fixed pivot means, and spring structure operably coupled with said shank for biasing the shank downwardly and for yieldably permitting upward swinging of the shank against the bias of the spring structure, said conversion apparatus comprising:

means for opening a seed planting furrow in the earth;
   means for mounting said furrow-opening means on the shank adjacent the lower end thereof;
   means for delivery of seed to a planting furrow opened by said furrow-opening means; and
   a furrow closing assembly including
      an earth-engaging element for closing a seed planting furrow;
      linkage means pivotally supporting said element in an up-and-down pivotal, earth-engaging, trailing relationship to said furrow-opening and seed delivery means, and for causing downward pivotal movement of the element in response to limited upward pivotal movement of said shank about said fixed pivot means in order to assure continual contact between the element and the earth,
   said linkage means including a first arm pivotally coupled with the shank adjacent said lower end thereof and extending upwardly and rearwardly therefrom, and a second arm pivotally coupled with said first arm adjacent the upper rearward end thereof and extending upwardly and forwardly therefrom; and
   a fixed pivotal coupling pivotally securing the upper and forward end of said second arm to the upper end of said bracket, whereby to define a four-bar linkage of which said bracket is a stationary bar and the shank and the arms are swingable bars,
   said earth engaging element being mounted for movement with said first arm.

2. Apparatus as set forth in claim 1, said earth-engaging element comprising a rotatable press wheel.

3. Apparatus as set forth in claim 1, said second arm having means rendering the same selectively adjustable in length for adjusting the vertical position of said element relative to the furrow-opening means.

4. Apparatus as set forth in claim 1, there being a rearwardly extending mounting arm secured to the lower end of said first linkage arm, said earth-engaging element being secured adjacent the rearward end of said mounting arm.

5. Apparatus as set forth in claim 1, said furrow-opening means comprising an elongated, narrow earth working shoe presenting a leading face.

6. Apparatus as set forth in claim 1, said delivery means comprising an elongated tube having a lowermost delivery end located adjacent the lower end of said shank and in trailing relationship to said furrow-opening means.

7. Apparatus as set forth in claim 1, said element also serving as a depth stop for said furrow-opening means, there being means for adjusting the vertical position of said element relative to that of said furrow-opening means.

8. Apparatus for converting a conventional pull-type earth-working implement into a planter, said conventional implement including an elongated, rearwardly and downwardly extending shank adapted to receive a lowermost earth-engaging tool, means supporting the upper end of said shank for pivoting movement thereof about a shank pivot axis, and spring structure operably coupled with said shank for biasing the shank downwardly and for permitting upward pivoting movement of the shank against the bias of the spring structure, said conversion apparatus comprising:
   means for opening a seed planting furrow in the earth;
   means mounting said furrow-opening means adjacent the lower end of said shank;
   means for delivery of seed to a planting furrow opened by said furrow-opening means; and
   a furrow closing assembly including-
      an earth-engaging element for closing a seed planting furrow; and
      linkage means pivotally supporting said element in an up-and-down pivotal, earth-engaging, trailing relationship to said furrow-opening and seed delivery means, and for causing downward pivotal movement of the element in response to limited upward pivotal movement of said shank about said shank pivot axis in order to assure continual contact between the element and the earth,
   said linkage means comprising a four-bar linkage assembly, said shank being one of the bars of the linkage assembly,
   said linkage assembly further comprising an upwardly extending first linkage arm pivotally secured to said shank proximal to the loer end thereof, a second, forwardly extending linkage arm pivotally secured adjacent the upper end of said first linkage arm and supported for pivotal movement adjacent the forward end thereof remote from said first linkage arm and at a point above said shank pivot axis, there being a rearwardly extending mounting arm secured to the lower end of said first linkage arm, said earth-engaging element being secured adjacent the rearward end of said mounting arm,
   said element also serving as a depth stop for said furrow-opening means, there being adjustment means for permittng pivotal coupling of said first arm to said second arm at any one of a number of spaced locations along the length of said second arm, whereby to adjust the vertical position of said element relative to that of said furrow-opening means.

9. Apparatus as set forth in claim 8, said spring structure including a bracket extending upwardly from said shank pivot axis, the forward end of said second linkage arm being pivotally coupled with said bracket.

10. A pull-behind planter implement comprising:
   a mobile frame;
   a stationary bracket on said frame having an upper end and a lower end;
   a downwardly extending shank pivotally attached at its upper end to the lower end of the bracket for up-and-down movement of the shank about a stationary shank pivot axis;
   spring structure operably coupled with said shank for biasing the shank downwardly and for permitting upward pivoting movement of the shank against the bias of the spring structure;
   means located adjacent the lower end of said shank for opening a seed planting furrow in the earth;
   means for delivery of seed to a planting furrow opened by said furrow-opening means; and a furrow closing assembly, including-
      an earth-engaging element for closing a seed planting furrow;
      linkage means pivotally supporting said element in an up-and-down pivotal, earth-engaging, trailing relationship to said furrow opening and seed delivery means, and for causing downward pivotal movement of the element in response to limited upward pivotal movement of said shank about said shank pivot axis in order to assure continual contact between the element and the earth,
   said linkage means including a first arm pivotally coupled with the shank adjacent said lower end thereof and extending upwardly and rearwardly therefrom, and a second arm pivotally coupled with said first arm adjacent the upper rearward end thereof and extending upwardly and forwardly therefrom; and
   a fixed pivotal coupling pivotally securing the upper and forward end of said second arm to the upper end of said bracket, whereby to define a four-bar linkage of which said bracket is a stationary bar and the shank and the arms are swingable bars,
   said earth engaging element being mounted for movement with said first arm.

11. The implement as set forth in claim 10, said earth-engaging element comprising a rotatable presss wheel.

12. The implement as set forth in claim 10, said second arm having means rendering the same selectively adjustable in length for adjusting the vertical position of said element relative to the furrow-opening means.

13. The implement as set forth in claim 10, there being a rearwardly extending mounting arm secured to the lower end of said first linkage arm, said earth-engaging element being secured adjacent the rearward end of said mounting arm.

14. The implement as set forth in claim 10, said furrow-opening means comprising an elongated, narrow earth working shoe presenting a leading face.

15. The implement as set forth in claim 10, said delivery means comprising an elongated tube having a lowermost delivery end located adjacent the lower end of said shank and in trailing relationship to said furrow-opening means.

16. A pull-behind planter implement comprising:
   a mobile frame;

a downwardly extending shank pivotally supported by said frame for up-and-down movement of the shank about a shank pivot axis;

spring structure operably coupled with said shank for biasing the shank downwardly and for permitting upward pivoting movement of the shank against the bias of the spring structure;

means located adjacent the lower end of said shank for opening a seed planting furrow in the earth;

means for delivery of seed to a planting furrow opened by said furrow-opening means;

a furrow closing assembly, including:
   an earth-engaging element for closing a seed planting furrow;
   linkage means pivotally supporting said element in an up-and-down pivotal, earth-engaging, trailing relationship to said furrow opening and seed delivery means, and for causing downward pivotal movement of the element in response to limited upward pivotal movement of said shank about said shank pivot axis in order to assure continual contact between the element and the earth,
   said linkage means comprising a four-bar linkage assembly, said shank being one of the bars of the linkage assembly,
   said linkage assembly further comprising an upwardly extending first linkage arm pivotally secured to said shank proximal to the lower end thereof, a second, forwardly extending linkage arm pivotally secured adjacent the upper end of said first linkage arm and supported for pivotal movement adjacent the forward end thereof remote from said first linkage arm and at a point above said shank pivot axis, there being a rearwardly extending mounting arm secured to the lower end of said first linkage arm, said earth-engaging element being secured adjacent the rearward end of said mounting arm,
   said element also serving as a depth stop for said furrow-opening means, there being adjustment means for permitting pivotal coupling of said first arm to said second arm at any one of a number of spaced locations along the length of said second arm, whereby to adjust the vertical position of said element relative to that of said furrow-opening means.

17. The implement as set forth in claim 16, said spring structure including a bracket extending upwardly from said shank pivot axis, the forward end of said second linkage arm being pivotally coupled with said bracket.

* * * * *